United States Patent
Pruitt et al.

(10) Patent No.: US 11,324,093 B1
(45) Date of Patent: May 3, 2022

(54) ADJUSTING UNDERLIGHTING OF A KEYBOARD INPUT DEVICE

(71) Applicant: Dell Products L.P., Round Rock, TX (US)

(72) Inventors: John S. Pruitt, Cedar Park, TX (US); Erik Summa, Austin, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/150,042

(22) Filed: Jan. 15, 2021

(51) Int. Cl.
*H05B 47/105* (2020.01)
*H05B 47/155* (2020.01)
*G06F 3/02* (2006.01)

(52) U.S. Cl.
CPC ......... *H05B 47/105* (2020.01); *G06F 3/0202* (2013.01); *G06F 3/0227* (2013.01); *H05B 47/155* (2020.01)

(58) Field of Classification Search
CPC .. H05B 47/155; H05B 47/105; H05B 47/175; H05B 47/11; H05B 47/19; G06F 3/0202; G06F 3/0227; Y02B 20/40
See application file for complete search history.

(56) References Cited

U.S. PATENT DOCUMENTS

| | | | |
|---|---|---|---|
| 8,711,011 B2 * | 4/2014 | Casparian | H03K 17/975 341/34 |
| 9,763,021 B1 * | 9/2017 | Peeler | H04S 7/40 |
| 10,748,505 B1 | 8/2020 | Galiano et al. | |
| 11,013,987 B1 * | 5/2021 | Pelissier | A63F 13/23 |
| 2012/0062123 A1 * | 3/2012 | Jarrell | H05B 47/155 315/131 |

\* cited by examiner

*Primary Examiner* — Haissa Philogene
(74) *Attorney, Agent, or Firm* — Baker Botts L.L.P.

(57) ABSTRACT

Adjusting underlighting of a keyboard input device, including identifying execution of a computer-implemented application on an IHS, and in response: accessing a database storing lighting profiles for the keyboard input device: determining whether a personalized lighting profile for the computer-implemented application is stored by the database; determining that the personalized lighting profile for the computer-implemented application is not stored by the database, and in response, determining whether an application-specific lighting profile for the computer-implemented application is stored by the database; determining that the application-specific lighting profile for the computer-implemented application is stored by the database, and in response, applying the application-specific lighting profile to the keyboard input device, including: adjusting a power state of a first subset of lights of the keyboard input device to an off power state while retaining an on-power state of a second subset of lights of the keyboard input device.

20 Claims, 8 Drawing Sheets
(5 of 8 Drawing Sheet(s) Filed in Color)

ADJUSTING UNDERLIGHTING OF A KEYBOARD INPUT DEVICE

BACKGROUND

Field of the Disclosure

The disclosure relates generally to an information handling system, and in particular, adjusting underlighting of a keyboard input device of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Digital gaming is at an all-time high, with PC platforms beating out consoles, mobile and dedicate devices. Game development studios are very prolific, with new game titles emerging constantly. Because of this, many users start playing one game, then quickly switch to another, then come back to an old one in a few months. Controls between games (especially if they are different genres) can be completely different, and cause the user some frustration to remember how to play correctly, let alone achieve mastery in a game.

SUMMARY

Innovative aspects of the subject matter described in this specification may be embodied in method for adjusting underlighting of a keyboard input device, the method comprising: identifying execution of a computer-implemented application on an information handling system, wherein the keyboard input device is coupled to the information handling system; in response to execution of the computer-implemented application: accessing a database storing lighting profiles for the keyboard input device: determining whether a personalized lighting profile for the computer-implemented application is stored by the database, the personalized lighting profile personalized for a user of the information handling system; determining that the personalized lighting profile for the computer-implemented application is not stored by the database, and in response, determining whether an application-specific lighting profile for the computer-implemented application is stored by the database, the application-specific lighting profile specific for the computer-implemented application; and determining that the application-specific lighting profile for the computer-implemented application is stored by the database, and in response, applying the application-specific lighting profile to the keyboard input device, including: adjusting a power state of a first subset of lights of the keyboard input device to an off power state while retaining an on-power state of a second subset of lights of the keyboard input device.

Other embodiments of these aspects include corresponding systems, apparatus, and computer programs, configured to perform the actions of the methods, encoded on computer storage devices.

These and other embodiments may each optionally include one or more of the following features. For instance, determining that the application-specific lighting profile for the computer-implemented application is not stored by the database, and in response, determining whether a genre-specific lighting profile for the computer-implemented application is stored by the database, the genre-specific lighting profile specific to a genre of the computer-implemented application; and determining that the genre-specific lighting profile for the computer-implemented application is stored by the database, and in response, applying the genre-specific lighting profile to the keyboard input device, including: adjusting the power state of the first subset of lights of the keyboard input device to the off power state while retaining the on-power state of the second subset of lights of the keyboard input device. Determining that the genre-specific lighting profile for the computer-implemented application is not stored by the database, and in response: determining a predominate color associated with the computer-implemented application; and adjusting a color state of the lights of the keyboard input device to the predominate color. Determining that the personalized lighting profile for the computer-implemented application is stored by the database, and in response, applying the personalized lighting profile to the keyboard input device, including: adjusting a color state of a third subset of lights of the second subset of lights of the keyboard input device; and adjusting a color state of a fourth subset of lights of the second subset of lights of the keyboard input device, wherein the color state of the third subset and the color state of the fourth subset differ. Identifying keystroke data associated with a session of the computer-implemented application; and generating a heatmap lighting profile based on the keystroke data. Continuously updating a color state of the lights of the keyboard input device based on a playback of the keystroke data. Classifying the keystroke data specific for interactions with the computer-implemented application; and updating the personalized lighting profile based on the classified keystroke data. Filtering the keystroke data to remove textual inputs; and generating the heatmap lighting profiled based on the filtered keystroke data.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

For a more complete understanding of the present disclosure and its features and advantages, reference is now made to the following description, taken in conjunction with the accompanying drawings which illustrate examples of the disclosure, and which may be combined with one another and with all other written and illustrated portions of this disclosure, unless clearly mutually exclusive.

DESCRIPTION OF PARTICULAR EMBODIMENT(S)

This disclosure discusses methods and systems for adjusting underlighting of a keyboard input device of an information handling system. In short, a light management computing module can update lights of the keyboard input device (lights that are positioned "underneath" of keys of the keyboard input device) based on lighting profiles that are associated with computer-implemented applications that are currently being executed by the information handling system. Specifically, the lighting profiles can indicate differing power states of the lights associated with keys of the keyboard input device. The lighting profiles can further indicate a color state of the lights (when in the on-power state). For example, for a gaming application, the lighting profiles can indicate a subset of lights of the keyboard input device to be powered-on (with the lights of the remaining keys powered-off) that correspond to keys that are used for the particular gaming application. By lighting only the keys that are used for the gaming application, a user of the gaming application can interact more efficiently with the gaming application. Furthermore, the lighting profiles can also indicate a color state of each light of the subset lights of the keyboard input device that are powered-on. For example, first lights corresponding to first keys can have a first color state and second lights corresponding to second keys can have a second color state. By lighting keys with different color states, the user of the gaming application can interact more efficiently with the gaming application.

Specifically, this disclosure discusses a system and a method adjusting underlighting of a keyboard input device, including identifying execution of a computer-implemented application on an information handling system, wherein the keyboard input device is coupled to the information handling system; in response to execution of the computer-implemented application: accessing a database storing lighting profiles for the keyboard input device: determining whether a personalized lighting profile for the computer-implemented application is stored by the database, the personalized lighting profile personalized for a user of the information handling system; determining that the personalized lighting profile for the computer-implemented application is not stored by the database, and in response, determining whether an application-specific lighting profile for the computer-implemented application is stored by the database, the application-specific lighting profile specific for the computer-implemented application; and determining that the application-specific lighting profile for the computer-implemented application is stored by the database, and in response, applying the application-specific lighting profile to the keyboard input device, including: adjusting a power state of a first subset of lights of the keyboard input device to an off power state while retaining an on-power state of a second subset of lights of the keyboard input device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Figure 1:
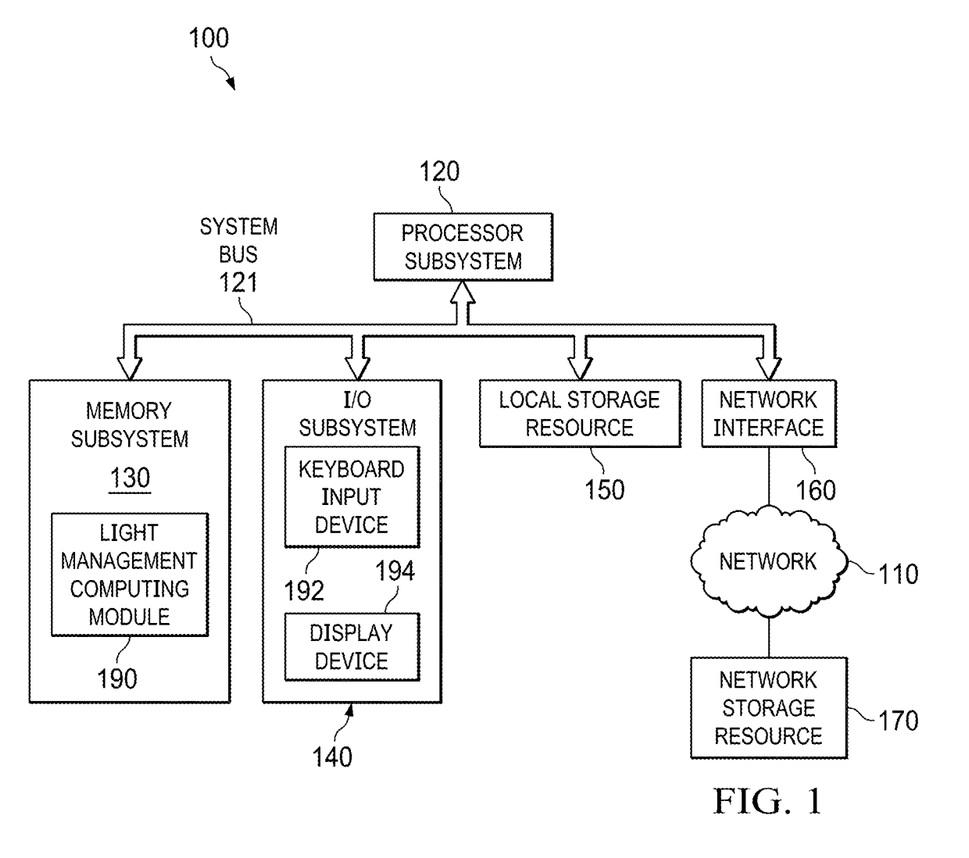
FIG. 1 is a block diagram of selected elements of an embodiment of a computing environment.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, as illustrated the I/O subsystem 140 includes a display device 194. In some examples, the I/O subsystem 140 can further include a keyboard input device 192. In some examples, the I/O subsystem 140 can further include a display device 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The memory subsystem 130 can include a light management computing module 190. The light management computing module 190 can include a computer-executable program (software). The content management computing module 190 can be executed by the processor subsystem 120.

In short, the light management computing module 190 can update lights of the keyboard input device 192 (lights that are positioned "underneath" of keys of the keyboard input device 192) based on lighting profiles that are associated with computer-implemented applications that are currently being executed by the information handling system. Specifically, the lighting profiles can indicate differing power states of the lights associated with keys of the keyboard input device 192. The lighting profiles can further indicate a color state of the lights (when in the on-power state). For example, for a gaming application, the lighting profiles can indicate a subset of lights of the keyboard input device to be powered-on (with the lights of the remaining keys powered-off) that correspond to keys that are used for the particular gaming application. By lighting only the keys that are used for the gaming application, a user of the gaming application can interact more efficiently with the gaming application. Furthermore, the lighting profiles can also indicate a color state of each light of the subset lights of the keyboard input device 192 that are powered-on. For example, first lights corresponding to first keys can have a first color state and second lights corresponding to second keys can have a second color state. By lighting keys with different color states, the user of the gaming application can interact more efficiently with the gaming application.

Figure 2:
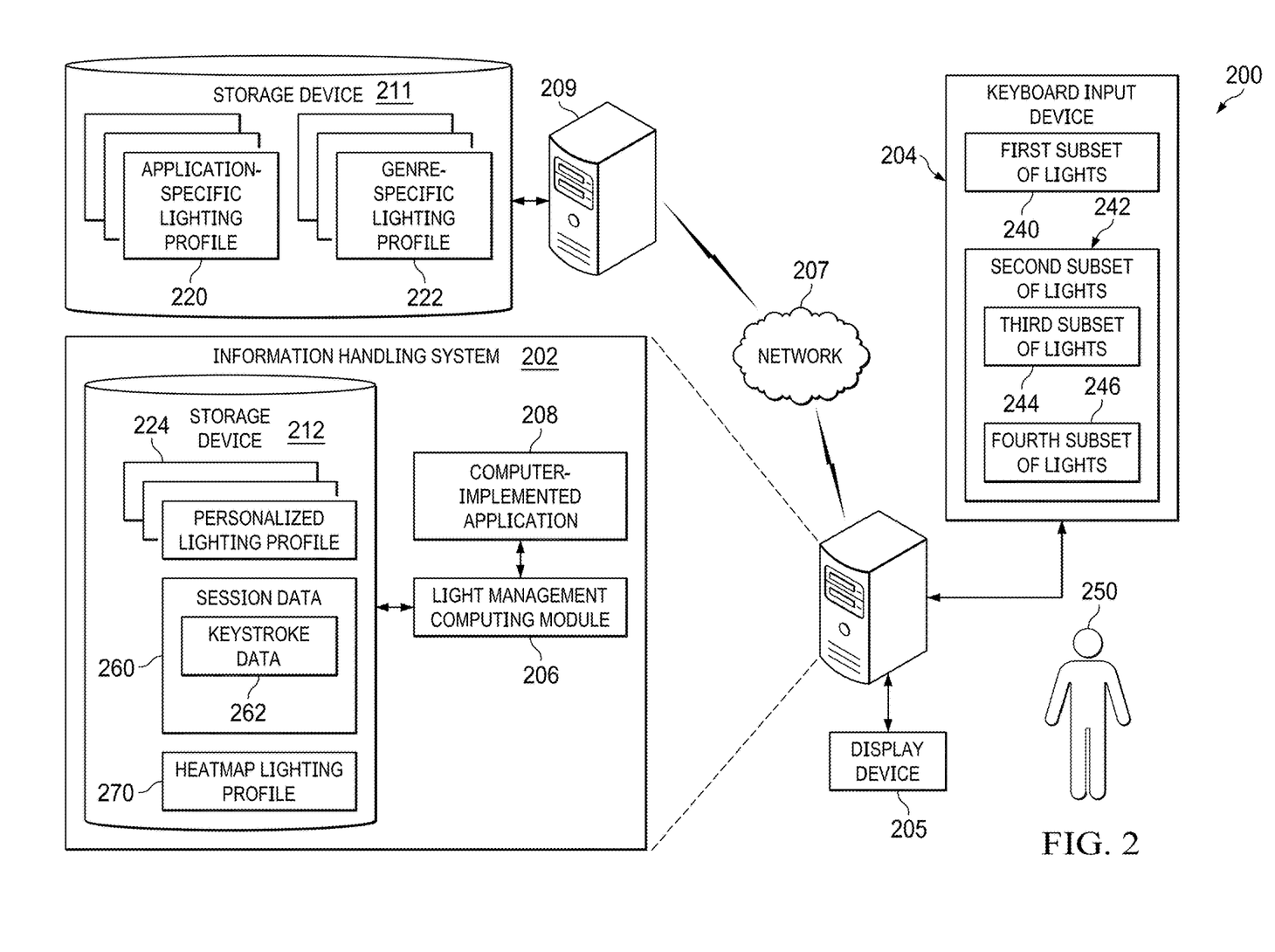
FIG. 2 illustrates a block diagram of a computing environment for adjusting underlighting of a keyboard input device of an information handling system.

Turning to FIG. 2, FIG. 2 illustrates an environment 200 including an information handling system 202, a keyboard input device 204, a display device 205, a network 207, a server computing system 209, and a storage device 211. The information handling system 202 can be in communication with the server computing system 209 over the network 207.

The information handling system 202 can be in communication with the keyboard input device 204 (e.g., the keyboard input device 204 is coupled to the information handling system 202), and the display device 205 (e.g., the display device 205 is coupled to the information handling system 202). The information handling system 202 can be similar to, or include, the information handling system 100 of FIG. 1. The keyboard input device 204 can be similar to, or include, the keyboard input device 192 of FIG. 1. The display device 205 can be similar to, or include, the display device 194 of FIG. 1.

The information handling system 202 can include a light management computing module 206, a computer-implemented application 208, and a storage device 212. The light management computing module 206 can be similar to, or include, the light management computing module 190 of FIG. 1. The light management computing module 206 is in communication with the keyboard input device 204, the computer-implemented application 208, and the storage device 212.

The keyboard input device 204 can provide key-based input to the information handling system 202 by a user 250 of the keyboard input device 204 and the information handling system 204. The keyboard input device 204 can further include a plurality of lights (e.g., an array of lights) positioned underneath keys of the keyboard input device 204 to provide light about each of the keys of the keyboard input device 204. In some examples, each key of the keyboard input 204 is associated with a light. In some examples, the keys of the keyboard input device 204 are associated with light by having light surrounding the key, transmit through at least a portion of the key (translucent key), or both.

The server computing system 209 can be in communication with the storage device 211. The storage device 211 can store, or provide access to the storage of, lighting profiles for the keyboard input device 204. The lighting profiles of the keyboard input device 204 can identify which keys of the keyboard input device 204 are to be in an on-state (illuminated), which keys of the keyboard input device 204 are to be in an off-state (darkened), and a color state of the keys of the keyboard input device 204 that are in the on-state, described further herein. For example, the storage device 211 stores application-specific lighting profiles 220 and genre-specific lighting profiles 222.

Similarly, the storage device 212 store, or provide access to the storage of, lighting profiles for the keyboard input device 204. For example, the storage device 212 stores personalized lighting profiles 224.

Figure 3:
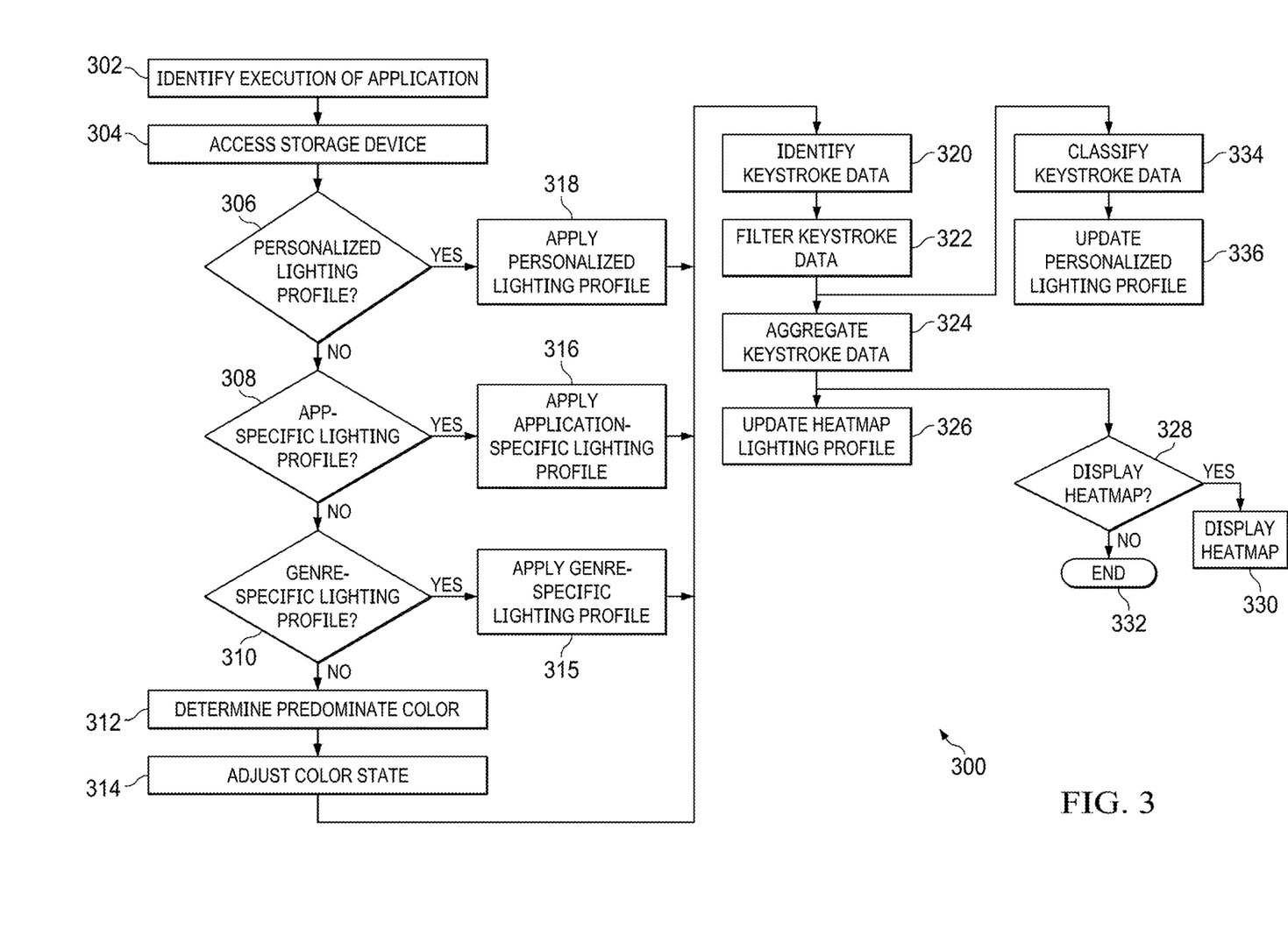
FIG. 3 illustrates a method for adjusting underlighting of a keyboard input device of an information handling system.

FIG. 3 illustrates a flowchart depicting selected elements of an embodiment of a method 300 for adjusting underlighting of a keyboard input device of an information handling system. The method 300 may be performed by the information handling system 100, the environment 200, the information handling system 202, and/or the light management computing module 206, and with reference to FIGS. 1-2. It is noted that certain operations described in method 300 may be optional or may be rearranged in different embodiments.

The light management computing module 206 can identify the execution of the computer-implemented application 208 on the information handling system 202, at step 302. Specifically, the light management computing module 206 can identify execution of the computer-implemented application 208 (e.g., "launching" of the computer-implemented application 208) by the processor subsystem 120 of FIG. 1. For example, the computer-implemented application 208 can include a gaming application.

The light management computing module 206, in response to detecting the execution of the computer-implemented application 208, can access the storage device 212, at step 304. Specifically, the light management computing module 206 can access the personalized lighting profiles 224 that are stored by the storage device 212. The personalized lighting profiles 224 can be personalized to the user 250, with each personalized lighting profile 224 associated with a particular computer-implemented application 208. That is, each computer-implemented application 208 is associated with a particular personalized lighting profile 224. For example, when the computer-implemented application 208 includes a gaming application, the personalized lighting profile 224 is a personalized lighting profile 224 for the user 250 for the gaming application. The personalized lighting profiles 224 can be personalized to the user 250 based on historical key usage of the keyboard input device 204 (described further below) for the computer-implemented application 208, or set by the user 250 for the computer-implemented application 208.

The light management computing module 206 can determine whether a personalized lighting profile 224 for the computer-implemented application 208 is stored by the storage device 212, at step 306. For example, the light management computing module 206 can determine if the user 250 has interacted with the computer-implemented application 208 before (e.g., played or launched the gaming application prior) and if the personalized lighting profile 224 was previously created for the computer-implemented application 208 and stored by the storage device 212.

The light management computing module 206 can determine that the personalized lighting profile 224 for the computer-implemented application 208 is not stored by the storage device 212, and in response, determine whether an application-specific lighting profile 220 for the computer-implemented application 208 is stored by the storage device 211, at 308. That is, when the light management computing module 206 determines that the personalized lighting profile 224 for the computer-implemented application 208 is not stored by the storage device 212, the light management computing module 206 accesses the storage device 211 through the server computing system 209. The application-specific lighting profile 220 can be specific for the computer-implemented application 208. For example, the application-specific lighting profile 220 can be based on individual controls of the computer-implemented application 208. That is, when the computer-implemented application 208 includes a gaming application, the application-specific lighting profile 220 can be based on individual controls for the gaming application. For example, the individual controls can be "default controls" for the gaming application provided by a publisher of the gaming application.

The light management computing module 206 can determine that the application-specific lighting profile 220 for the computer-implemented application 208 is not stored by the storage device 211, and in response, determine whether a genre-specific lighting profile 222 for the computer-implemented application 208 is stored by the storage device 211, at 310. That is, when the light management computing module 206 determines that the application-specific lighting profile 220 for the computer-implemented application 208 is not stored by the storage device 212, the light management computing module 206 accesses the storage device 211 through the server computing system 209. The genre-specific lighting profile 222 can be specific for a genre of the computer-implemented application 208. For example, the application-specific lighting profile 220 can be based on controls for the genre of the computer-implemented application 208. That is, when the computer-implemented application 208 includes a gaming application and the genre of the gaming application is a race car driving simulation gaming application, the application-specific lighting profile 220 can be based on generic controls for the genre of race car driving simulation gaming applications.

Figure 4:
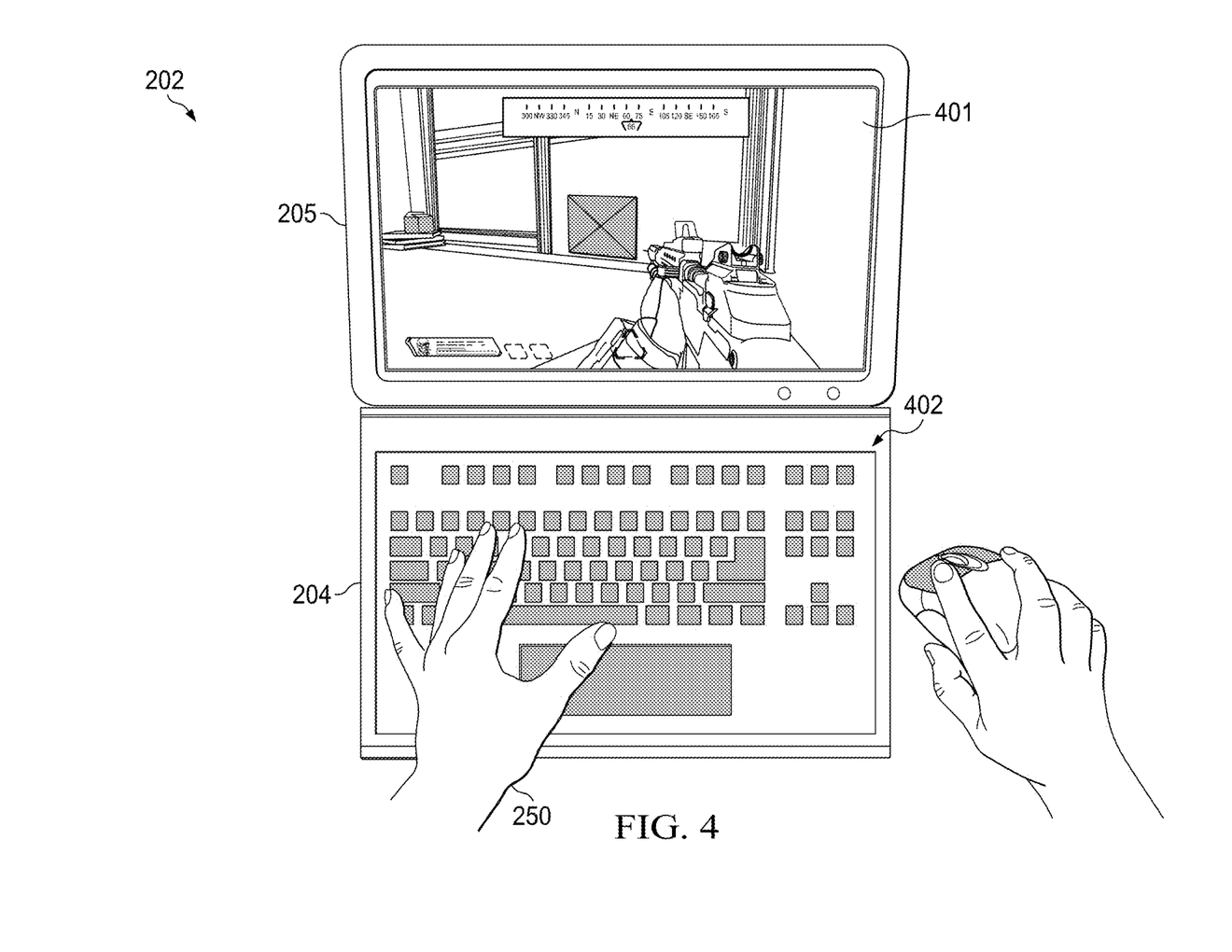
FIGS. 4-8 illustrate a keyboard input device of an information handling system with differing underlighting configurations.

The light management computing module 206 can determine that the genre-specific lighting profile 222 for the computer-implemented application 208 is not stored by the storage device 211, and in response, determine a predominate color associated with the computer-implemented application 208, at 312. For example, when the computer-implemented application 208 include a gaming application, the gaming application can be associated with game art and/or box art. The light management computing module 206 can determine the predominate color associated with the game art and/or the box art. The light management computing module 206 can then adjust a color state of the lights of the keyboard input device 204 to the predominate color, at 314. For example, FIG. 4 illustrates the keyboard input device 204 including a plurality of keys 402. The monitor 205 can display game art 401 of the computer-implemented application 208 (e.g., a gaming application), with the light management computing module 206 determining the predominate (single) color associated with the game art 401. The light management computing module 206 can then adjust the color state of the lights surrounding the keys 402 of the keyboard input device 204 to the predominate color.

Figure 5:
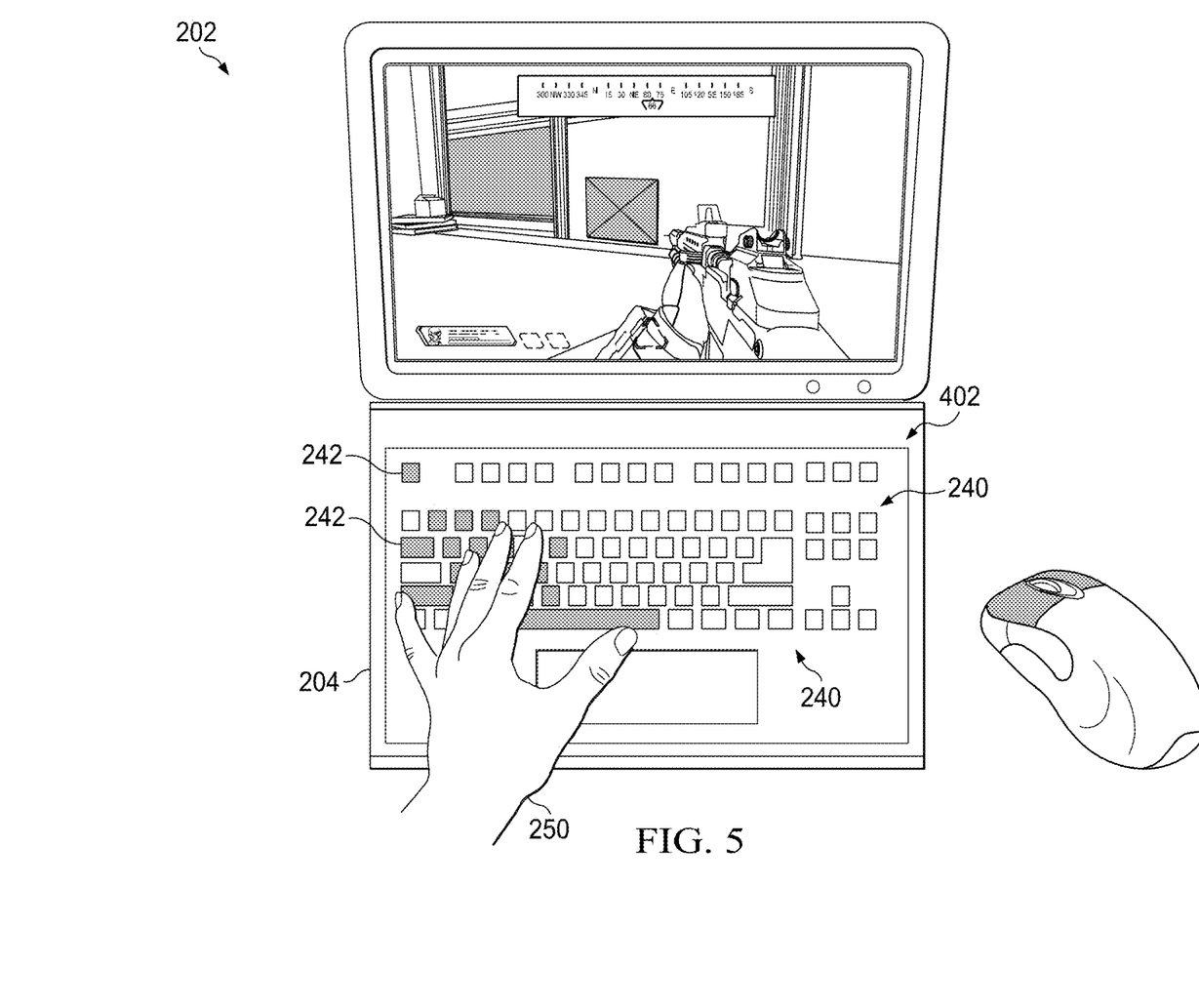

Referring back to FIG. 3, in some examples, the light management computing module 206 can determine that the genre-specific lighting profile 222 for the computer-implemented application 208 is stored by the storage device 211 (at 310), and in response, apply the genre-specific lighting profile 222 to the keyboard input device 204, at step 315. Specifically, the light management computing module 206 applies the genre-specific lighting profile 222 to the keyboard input device 204 by adjusting the power state of a first subset of lights 240 of the keyboard input device 204 to the off-power state (darkened) while retaining the on-power state of a second subset of lights 242 of the keyboard input device 204. For example, FIG. 5 illustrates the keyboard input device 204 after the light management computing module 206 applies the genre-specific lighting profile 222 to the keyboard input device 204. Specifically, the keyboard input device 204 is shown with the first subset of lights 240 in the off-power state and the second subset of lights 242 in the on-power state. Furthermore, the second subset of lights 242 that are in the on-power state can have the color state of the previously determined predominate color of the computer-implemented application 208 (e.g., the predominate color of the game art 401 of the gaming application).

Referring back to FIG. 3, in some examples, the light management computing module 206 can determine that the application-specific lighting profile 220 for the computer-implemented application 208 is stored by the storage device 211 (at 308), and in response, apply the application-specific lighting profile 220 to the keyboard input device 204, at step 316. Specifically, the light management computing module 206 applies the application-specific lighting profile 220 to the keyboard input device 204 by adjusting the power state of the first subset of lights 240 of the keyboard input device 204 to the off-power state (darkened) while retaining the on-power state of the second subset of lights 242 of the keyboard input device 204. For example, similar to that above with respect to the genre-specific lighting profile 222, FIG. 5 illustrates the keyboard input device 204 after the light management computing module 206 applies the application-specific lighting profile 220 to the keyboard input device 204. Specifically, the keyboard input device 204 is shown with the first subset of lights 240 in the off-power state and the second subset of lights 242 in the on-power state. Furthermore, the second subset of lights 242 that are in the on-power state can have the color state of the previously determined predominate color of the computer-implemented application 208 (e.g., the predominate color of the game art 401 of the gaming application).

Figure 6:
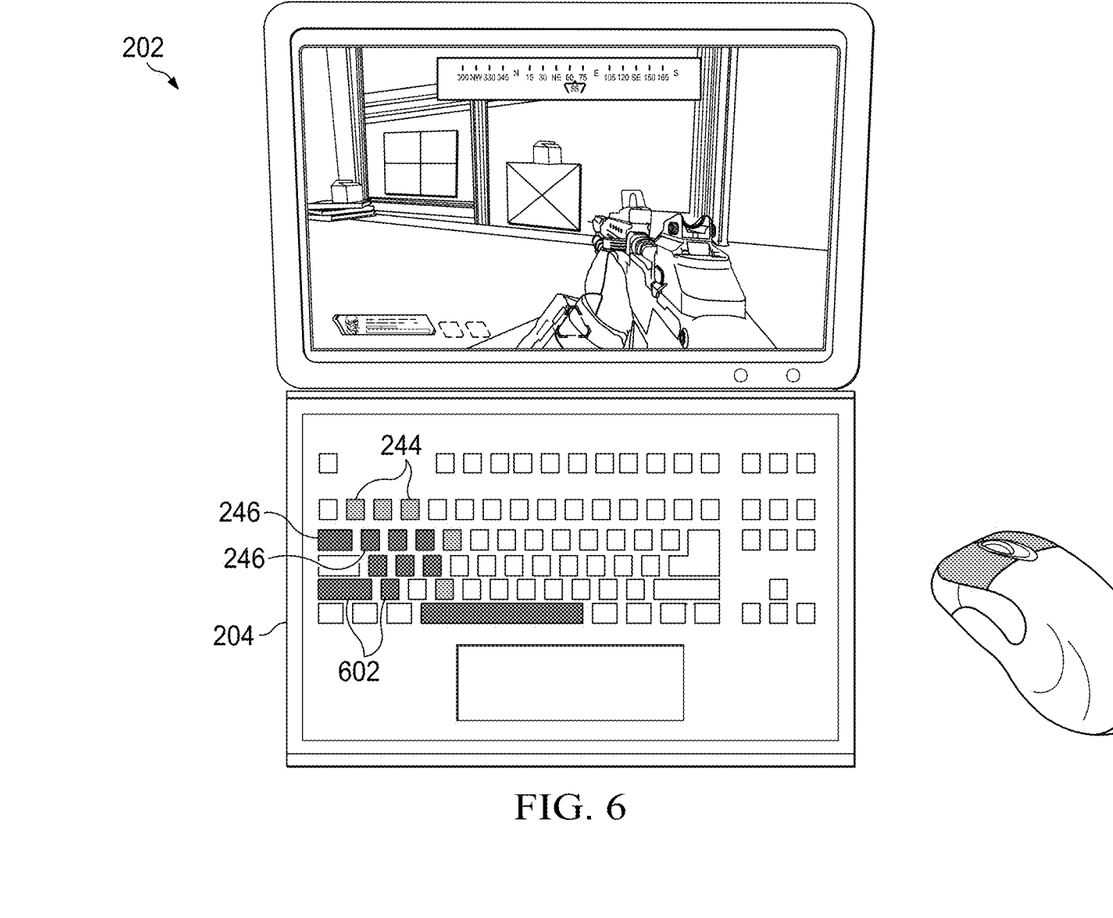

Referring back to FIG. 2, in some examples, the light management computing module 206 applies the application-specific lighting profile 220 to the keyboard input device 204 by adjusting color states of a third subset of lights 244 and a fourth subset of lights 246 of the second subset of lights 242 of the keyboard input device 204, with the color states of the third 244 and the fourth 246 subsets of lights differing. For example, FIG. 6 illustrates the keyboard input device 204 after the light management computing module 206 applies the application-specific lighting profile 220 to the keyboard input device 204 by adjusting the color states of the third subset of lights 244 and the fourth subset of lights 246 of the second subset of lights 242 of the keyboard input device 204. For example, the third subset of lights 244 can be associated with a first type of key classification and the fourth subset of lights 246 can be associated with a second type of key classification. For example, when the computer-implemented application 208 includes a gaming application, the classification of the types of the keys can include movement, active/combat, utility, and other. Thus, the color state of the third subset of lights 244 can indicate a classification that the corresponding keys are used for when the user 250 is engaged with the computer-implemented application 208, while the color state of the fourth subset of lights 246 can indicate a differing classification the corresponding keys are used for when the user 250 is engaged with the computer-implemented application 208. The keyboard input device 204 can include any number of subsets of lights, for example, shown as subset of lights 602.

Referring back to FIG. 3, in some examples, the light management computing module 206 can determine that the personalized lighting profile 224 for the computer-implemented application 208 is stored by the storage device 212 (at 306), and in response, apply the personalized lighting profile 224 to the keyboard input device 204, at step 318. For example, the light management computing module 206 applies the personalized lighting profile 224 to the keyboard input device 204 by adjusting the power state of the first subset of lights 240 of the keyboard input device 204 to the off-power state (darkened) while retaining the on-power state of the second subset of lights 242 of the keyboard input device 204, as shown in FIG. 4. For example, light management computing module 206 applies the personalized lighting profile 224 to the keyboard input device 204 by adjusting color states of the third subset of lights 244 and the fourth subset of lights 246 of the second subset of lights 242 of the keyboard input device 204, with the color states of the third 244 and the fourth 246 subsets of lights differing, as shown in FIG. 6.

In some examples, the light management computing module 206 can identify (capture) keystroke data associated with a session of the computer-implemented application 208. The light management computing module 206 can store session data 260 at the storage device 212, including keystroke data 262 (time series data) at the storage device 212. To that end, as the user 250 engages with the computer-implemented application 208 over a period of time (e.g., a session), the light management computing module 206 can implement a key classification model (e.g., a machine learning model) to classify the input for the computer-implemented application 208. For example, the light management computing module 206 can implement the key classification model to classify the input when the computer-implemented application 208 is a gaming application as 'movement', 'active/combat', 'utility', or 'unused' based on key autocorrelation, pairwise cross-correlation, keypress duration, and normalized frequency of usage in the session.

In some examples, the light management computing module 206 can generate the personalized lighting profile 224 for the computer-implemented application 208 based on the classification of the keys. In some examples, the light management computing module 206 can generate the personalized lighting profile 224 for the computer-implemented application 208 based on a color palate of the game art or box art when the computer-implemented application 208 includes a gaming application.

In some examples, after the user 250 has completed a session with the computer-implemented application 208 (e.g., the user 250 has finished engaging with the gaming application), the light management computing module 206 can provide a visual representation of the session through lighting of the keyboard input device 204 (e.g., based on frequency of keystrokes, or as a sequence of keystrokes). For example, the user 250 can compare their performance (interaction metric with respect to the keyboard input device 204) versus other users, or against their own performance over time, utilizing the lighting of the keyboard input device 204.

Figure 7:
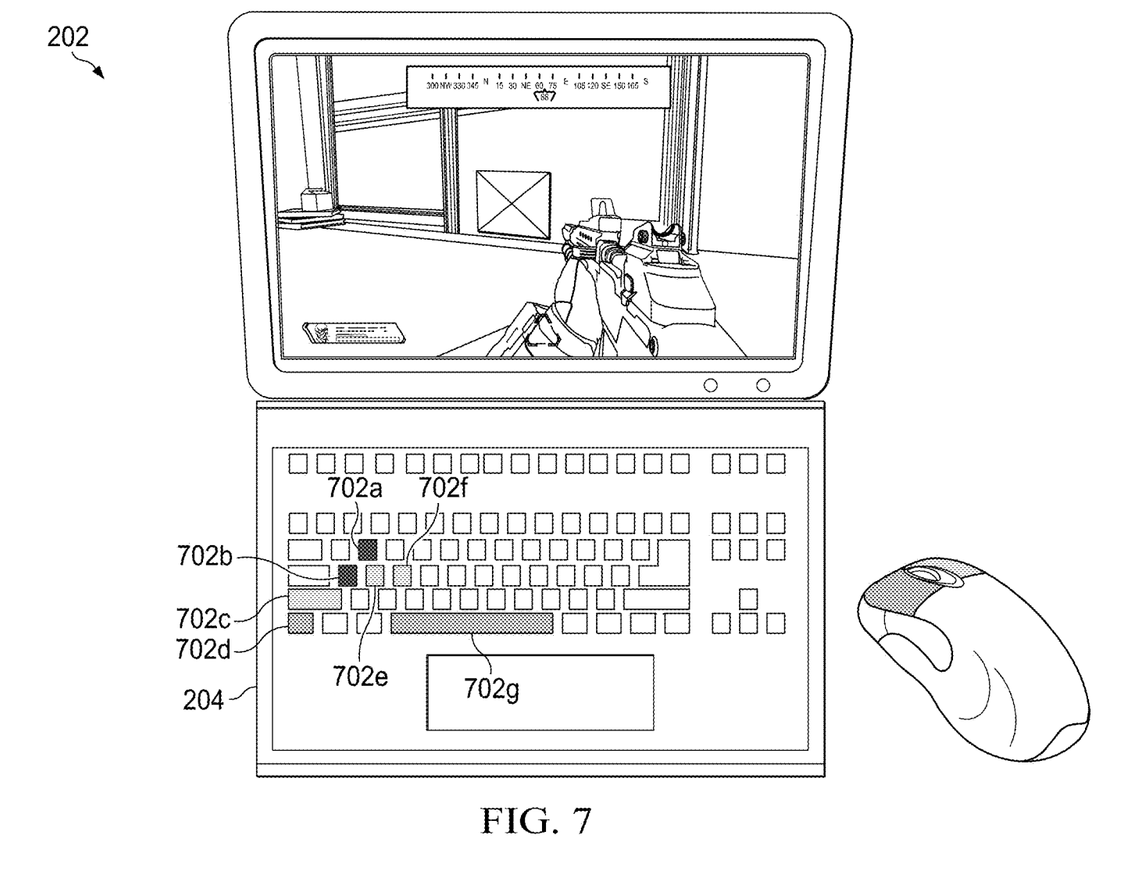

Referring back to FIG. 3, the light management computing module 206 can identify the keystroke data associated with the session of the computer-implemented application 208, at 320. The keystroke data can include a keystroke distribution of the keys of the keyboard input device 204 during engagement with the computer-implemented application 208 by the user 250 during the session. The light management computing module 206 can filter the keystroke data 262 to remove textual inputs, at 322. For example, the light management computing module 206 can remove textual inputs from the keystroke data 262 related to non-computer-implemented application 208 input (non-gaming application input) such as chat, passwords, searching. The light management computing module 206 can remove the textual inputs from the keystroke data 262 using newline delimiters, typing frequency patterns, and dictionary matches. The light management computing module 206 can aggregate the filtered keystroke data for the computer-implemented application 208 over the session, at 324. The light management computing module 206 can store session data 260 at the storage device 212, including the aggregated keystroke data 262 (time series data) at the storage device 212. The light management computing module 206 can generate/update a heatmap lighting profile 270 based on the aggregated-filtered keystroke data 262, at 326. The light management computing module 206 can store the heatmap lighting profile 270 at the storage device 212. For example, the heatmap lighting profile 270 can be representative of the aggerated keystroke data 262 in terms of frequency of keystrokes of the keys of the keyboard input device 204. For example, as shown in FIG. 7, the keyboard input device 204 is shown with the heatmap lighting profile 270 applied to the keys 702a, 702b, 702c, 702d, 702e, 702f, 702g (collectively referred to as keys 702). That is, each color state of each of the keys 702 indicates a differing frequency of keystroke interaction for the computer-implemented application 208 for the session (or over multiple sessions).

Figure 8:
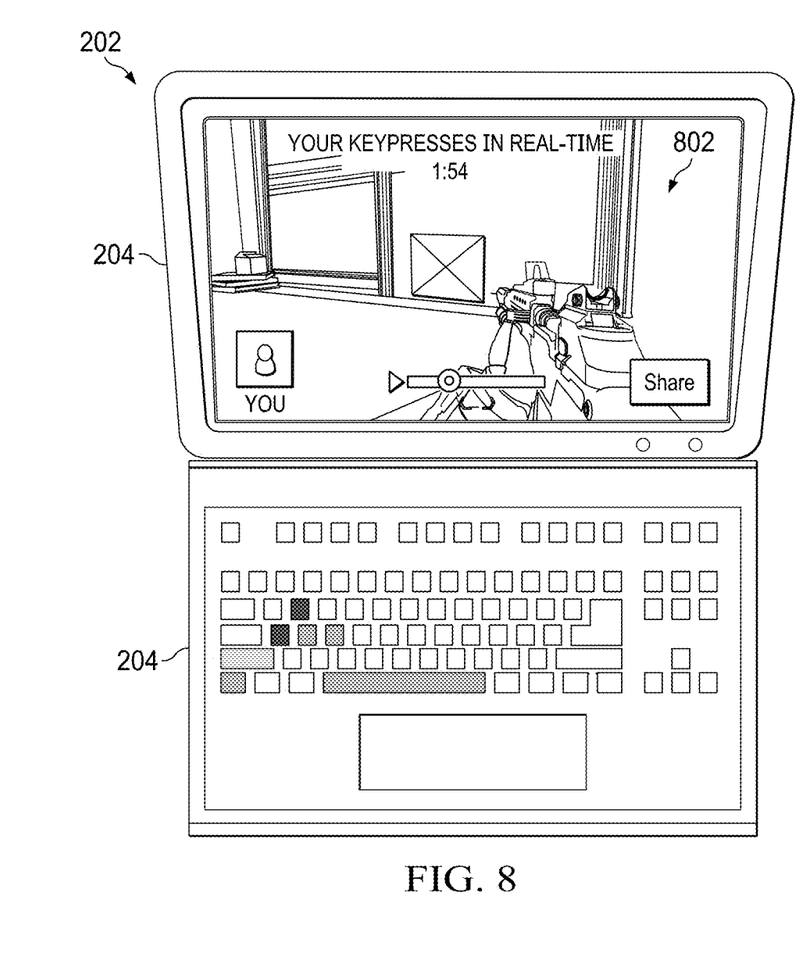

Referring back to FIG. 3, furthermore, the light management computing module 206, after aggregating the keystroke data 262 for the computer-implemented application 208 over the session, can determine whether the user 250 has indicated to display the heatmap lighting profile 270 on the keyboard input device 204, at 328. The light management computing module 206 can determine that the user 250 has indicted to display the heatmap lighting profile 270 on the keyboard input device 204, and in response, display the heatmap lighting profile 270 on the keyboard input device 204 (as shown in FIG. 6), at 330. Specifically, the light management computing module 206 can continuously update the color state of the lights of the keyboard input device 204 based on a playback of the keystroke data 262. For example, FIG. 8 illustrates an example of the heatmap lighting profile 270 displayed on the keyboard input device 204, including update of the color state of the lights of the keyboard input device 204 based on a playback of the keystroke data 262. Specifically, the display device 205 can show a video playback of the session of interaction by the user 250 with the computer-implemented application 208. For example, the computer-implemented application 208 can include a gaming application, and the display device 205 can show a video playback 802 of the gameplay by the user 250 with the gaming application. That is, the user 250 can scroll thru the video playback 802 of the session based on time. As the display device 205 scrolls through the video playback 802 of the gameplay, the color state of the lights of the keyboard input device 204 are correspondingly updated as the video playback 802 adjusted through time. That is, for each moment in time of the video playback 802, the color state of keys of the keyboard input device 204 are updated based on the interaction by the user 250 with the keyboard input device 204 at each moment in time. Thus, as the user 250 scrolls through the video playback 802, the user 250 is able to see their interaction with the keys of the keyboard input device 204 based on the changing color states of the keys of the keyboard input device 204. In other words, as the user 250 scrolls through the video playback 802, the sequence of key interaction by the user 250 for each moment time is displayed via updates to the color states of the keys of the keyboard input device 204.

The light management computing module 206 can determine that the user 250 has not indicted to display the heatmap lighting profile 270 on the keyboard input device 204, and in response, take no action, at 332.

Referring back to FIG. 3, furthermore, the light management computing module 206 can classify the keystroke data 262 specific for interactions with the computer-implemented application 208, at 334. The light management computing module 206 can classify the keystroke data 262 into classifications based on the computer-implemented application 208. For example, when the computer-implemented application 208 includes a gaming application, the light management computing module 206 can classify the keystroke data 262 into such classes as movement, active/combat, utility, and unused based on autocorrelation, pairwise cross-correlation, keypress duration, and overall frequency of usage. The light management computing module 206 can update the personalized lighting profile 224 based on the classified keystroke data 262, at 336.

In some examples, the display device 205 can show a video play back of a session of interaction by another user with the computer-implemented application 208. For example, the computer-implemented application 208 can include a gaming application, and the display device 205 can show a video playback of the gameplay by the other user with the gaming application. The other user can include a "professional" gaming player. As the display device 205 scrolls through the video playback of the gameplay, the color state of the lights of the keyboard input device 204 are correspondingly updated as the video playback 802 adjusted through time based on the interactions by the "professional" gaming player with the gaming application.

In some examples, the light management computing module 206 can access keystroke data of the other user with the computer-implemented application 208. The light management computing module 206 can provide for display on the display device 205 (e.g., during video play back of the session of interaction by the other user with the computer-implemented application 208) metrics of the keystroke data of the other user with the computer-implemented application 208. For example, the light management computing module 206 can provide for display on the display device 205 such metrics of frequency of key button presses, sequence of key button presses, duration of key button presses, and similar of the other user during interaction of the other user with the computer-implemented application 208. In some examples, the light management computing module 206 can compare the keystroke data 262 with the keystroke data of the other user with the computer-implemented application 208. The light management computing module 206 can provide for display on the display device 205 (e.g., during video play back of the session of interaction by the other user with the computer-implemented application 208) metrics of such comparison. For example, the light management computing module 206 can provide for display on the display device 205 a comparison of such metrics of frequency of key button presses, sequence of key button presses, duration of key button presses, and similar of the other user during interaction of the other user with the computer-implemented application 208 and the user 250 during the session.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of adjusting under-lighting of a keyboard input device, the method comprising:
   identifying execution of a computer-implemented application on an information handling system, wherein the keyboard input device is coupled to the information handling system;
   in response to execution of the computer-implemented application:
      accessing a database storing lighting profiles for the keyboard input device:
      determining whether a personalized lighting profile for the computer-implemented application is stored by the database, the personalized lighting profile personalized for a user of the information handling system;
      determining that the personalized lighting profile for the computer-implemented application is not stored by the database, and in response, determining whether an application-specific lighting profile for the computer-implemented application is stored by the database, the application-specific lighting profile specific for the computer-implemented application; and
      determining that the application-specific lighting profile for the computer-implemented application is stored by the database, and in response, applying the application-specific lighting profile to the keyboard input device, including:
         adjusting a power state of a first subset of lights of the keyboard input device to an off power state while retaining an on-power state of a second subset of lights of the keyboard input device.

2. The computer-implemented method of claim 1, further comprising:
determining that the application-specific lighting profile for the computer-implemented application is not stored by the database, and in response, determining whether a genre-specific lighting profile for the computer-implemented application is stored by the database, the genre-specific lighting profile specific to a genre of the computer-implemented application; and
determining that the genre-specific lighting profile for the computer-implemented application is stored by the database, and in response, applying the genre-specific lighting profile to the keyboard input device, including: adjusting the power state of the first subset of lights of the keyboard input device to the off power state while retaining the on-power state of the second subset of lights of the keyboard input device.

3. The computer-implemented method of claim 2, further comprising:
determining that the genre-specific lighting profile for the computer-implemented application is not stored by the database, and in response:
determining a predominate color associated with the computer-implemented application; and
adjusting a color state of the lights of the keyboard input device to the predominate color.

4. The computer-implemented method of claim 1, further comprising:
determining that the personalized lighting profile for the computer-implemented application is stored by the database, and in response, applying the personalized lighting profile to the keyboard input device, including:
adjusting a color state of a third subset of lights of the second subset of lights of the keyboard input device; and
adjusting a color state of a fourth subset of lights of the second subset of lights of the keyboard input device, wherein the color state of the third subset and the color state of the fourth subset differ.

5. The computer-implemented method of claim 1, further comprising:
identifying keystroke data associated with a session of the computer-implemented application; and
generating a heatmap lighting profile based on the keystroke data.

6. The computer-implemented method of claim 5, further comprising:
continuously updating a color state of the lights of the keyboard input device based on a playback of the keystroke data.

7. The computer-implemented method of claim 5, further comprising:
classifying the keystroke data specific for interactions with the computer-implemented application; and
updating the personalized lighting profile based on the classified keystroke data.

8. The computer-implemented method of claim 5, further comprising:
filtering the keystroke data to remove textual inputs; and
generating the heatmap lighting profiled based on the filtered keystroke data.

9. An information handling system comprising a processor having access to memory media storing instructions executable by the processor to perform operations comprising, comprising:
identifying execution of a computer-implemented application on an information handling system, wherein a keyboard input device is coupled to the information handling system;
in response to execution of the computer-implemented application:
accessing a database storing lighting profiles for the keyboard input device:
determining whether a personalized lighting profile for the computer-implemented application is stored by the database, the personalized lighting profile personalized for a user of the information handling system;
determining that the personalized lighting profile for the computer-implemented application is not stored by the database, and in response, determining whether an application-specific lighting profile for the computer-implemented application is stored by the database, the application-specific lighting profile specific for the computer-implemented application; and
determining that the application-specific lighting profile for the computer-implemented application is stored by the database, and in response, applying the application-specific lighting profile to the keyboard input device, including:
adjusting a power state of a first subset of lights of the keyboard input device to an off power state while retaining an on-power state of a second subset of lights of the keyboard input device.

10. The information handling system of claim 9, the operations further comprising:
determining that the application-specific lighting profile for the computer-implemented application is not stored by the database, and in response, determining whether a genre-specific lighting profile for the computer-implemented application is stored by the database, the genre-specific lighting profile specific to a genre of the computer-implemented application; and
determining that the genre-specific lighting profile for the computer-implemented application is stored by the database, and in response, applying the genre-specific lighting profile to the keyboard input device, including: adjusting the power state of the first subset of lights of the keyboard input device to the off power state while retaining the on-power state of the second subset of lights of the keyboard input device.

11. The information handling system of claim 10, the operations further comprising:
determining that the genre-specific lighting profile for the computer-implemented application is not stored by the database, and in response:
determining a predominate color associated with the computer-implemented application; and
adjusting a color state of the lights of the keyboard input device to the predominate color.

12. The information handling system of claim 9, the operations further comprising
determining that the personalized lighting profile for the computer-implemented application is stored by the database, and in response, applying the personalized lighting profile to the keyboard input device, including:
adjusting a color state of a third subset of lights of the second subset of lights of the keyboard input device; and
adjusting a color state of a fourth subset of lights of the second subset of lights of the keyboard input device, wherein the color state of the third subset and the color state of the fourth subset differ.

13. The information handling system of claim 9, the operations further comprising:
identifying keystroke data associated with a session of the computer-implemented application; and
generating a heatmap lighting profile based on the keystroke data.

14. The information handling system of claim 13, the operations further comprising:
continuously updating a color state of the lights of the keyboard input device based on a playback of the keystroke data.

15. The information handling system of claim 13, the operations further comprising:
classifying the keystroke data specific for interactions with the computer-implemented application; and
updating the personalized lighting profile based on the classified keystroke data.

16. The information handling system of claim 13, the operations further comprising:
filtering the keystroke data to remove textual inputs; and
generating the heatmap lighting profiled based on the filtered keystroke data.

17. A non-transitory computer-readable medium storing software comprising instructions executable by one or more computers which, upon such execution, cause the one or more computers to perform operations comprising:
identifying execution of a computer-implemented application on an information handling system, wherein a keyboard input device is coupled to the information handling system;
in response to execution of the computer-implemented application:
accessing a database storing lighting profiles for the keyboard input device:
determining whether a personalized lighting profile for the computer-implemented application is stored by the database, the personalized lighting profile personalized for a user of the information handling system;
determining that the personalized lighting profile for the computer-implemented application is not stored by the database, and in response, determining whether an application-specific lighting profile for the computer-implemented application is stored by the database, the application-specific lighting profile specific for the computer-implemented application; and
determining that the application-specific lighting profile for the computer-implemented application is stored by the database, and in response, applying the application-specific lighting profile to the keyboard input device, including:
adjusting a power state of a first subset of lights of the keyboard input device to an off power state while retaining an on-power state of a second subset of lights of the keyboard input device.

18. The computer-readable medium of claim 17, the operations further comprising:
determining that the application-specific lighting profile for the computer-implemented application is not stored by the database, and in response, determining whether a genre-specific lighting profile for the computer-implemented application is stored by the database, the genre-specific lighting profile specific to a genre of the computer-implemented application; and
determining that the genre-specific lighting profile for the computer-implemented application is stored by the database, and in response, applying the genre-specific lighting profile to the keyboard input device, including:
adjusting the power state of the first subset of lights of the keyboard input device to the off power state while retaining the on-power state of the second subset of lights of the keyboard input device.

19. The computer-readable medium of claim 18, the operations further comprising:
determining that the genre-specific lighting profile for the computer-implemented application is not stored by the database, and in response:
determining a predominate color associated with the computer-implemented application; and
adjusting a color state of the lights of the keyboard input device to the predominate color.

20. The computer-readable medium of claim 17, the operations further comprising
determining that the personalized lighting profile for the computer-implemented application is stored by the database, and in response, applying the personalized lighting profile to the keyboard input device, including:
adjusting a color state of a third subset of lights of the second subset of lights of the keyboard input device; and
adjusting a color state of a fourth subset of lights of the second subset of lights of the keyboard input device, wherein the color state of the third subset and the color state of the fourth subset differ.

* * * * *